(12) United States Patent
Shannon et al.

(10) Patent No.: US 11,880,306 B2
(45) Date of Patent: Jan. 23, 2024

(54) APPARATUS, SYSTEM, AND METHOD FOR CONFIGURING A CONFIGURABLE COMBINED PRIVATE AND SHARED CACHE

(71) Applicant: Ampere Computing LLC, Santa Clara, CA (US)

(72) Inventors: Richard James Shannon, Portland, OR (US); Stephan Jean Jourdan, Santa Clara, CA (US); Matthew Robert Erler, Portland, OR (US); Jared Eric Bendt, Hillsboro, OR (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 17/834,661

(22) Filed: Jun. 7, 2022

(65) Prior Publication Data
US 2022/0398195 A1    Dec. 15, 2022

Related U.S. Application Data

(60) Provisional application No. 63/208,722, filed on Jun. 9, 2021.

(51) Int. Cl.
*G06F 12/084* (2016.01)
*G06F 12/0846* (2016.01)
*G06F 9/30* (2018.01)
*G06F 12/14* (2006.01)

(52) U.S. Cl.
CPC ........ *G06F 12/084* (2013.01); *G06F 9/30047* (2013.01); *G06F 9/30105* (2013.01); *G06F 12/0848* (2013.01); *G06F 12/1458* (2013.01)

(58) Field of Classification Search
CPC .............. G06F 12/084; G06F 9/30047; G06F 9/30105; G06F 12/0848; G06F 12/1458
See application file for complete search history.

(56) References Cited

U.S. PATENT DOCUMENTS

| | | |
|---|---|---|
| 5,875,464 A | 2/1999 | Kirk |
| 7,287,254 B2 | 10/2007 | Miller et al. |
| 7,853,752 B1 | 12/2010 | Agarwal et al. |

(Continued)

FOREIGN PATENT DOCUMENTS

| | | |
|---|---|---|
| CN | 107870871 A | 4/2018 |
| JP | 2001282617 A | 10/2001 |

(Continued)

OTHER PUBLICATIONS

Tsai, W.-Y, et al., "A Port-Configuration Assisted NIC IRQ Affinitization Scheme for Multi-Core Packet Forwarding Applications," 2012 IEEE Global Communications Conference (GLOBECOM), Dec. 3-7, 2012, Anaheim, CA, USA, IEEE, 6 pages.

(Continued)

*Primary Examiner* — Gurtej Bansal
(74) *Attorney, Agent, or Firm* — Withrow & Terranova, PLLC (57) ABSTRACT

Aspects disclosed in the detailed description include configuring a configurable combined private and shared cache in a processor. Related processor-based systems and methods are also disclosed. A combined private and shared cache structure is configurable to select a private cache portion and a shared cache portion.

14 Claims, 8 Drawing Sheets

(56) References Cited

U.S. PATENT DOCUMENTS

| | | |
|---|---|---|
| 8,543,769 B2 | 9/2013 | Rajamony et al. |
| 2007/0143546 A1 | 6/2007 | Narad |
| 2009/0249094 A1 | 10/2009 | Marshall et al. |
| 2011/0161943 A1 | 6/2011 | Bellows et al. |
| 2012/0198172 A1 | 8/2012 | Lin et al. |
| 2013/0138891 A1 | 5/2013 | Chockler et al. |
| 2013/0205119 A1 | 8/2013 | Rajwar et al. |
| 2014/0040556 A1 | 2/2014 | Walker |
| 2014/0201452 A1* | 7/2014 | Meredith .............. G06F 12/127 711/130 |
| 2019/0065374 A1 | 2/2019 | Hower et al. |

FOREIGN PATENT DOCUMENTS

| | | |
|---|---|---|
| WO | 2020256610 A1 | 12/2020 |
| WO | 2021066844 A1 | 4/2021 |

OTHER PUBLICATIONS

International Search Report and Written Opinion for International Patent Application No. PCT/US2022/032694, dated Sep. 21, 2022, 15 pages.

International Search Report and Written Opinion for International Patent Application No. PCT/US2022/032697, dated Sep. 29, 2022, 35 pages.

International Search Report and Written Opinion for International Patent Application No. PCT/US2022/032701, dated Sep. 22, 2022, 17 pages.

ARM, "AMBA 5 CHI Architecture Specification," ARM IHI 0050E. b, Aug. 16, 2021, ARM Limited, 508 page.

Non-Final Office Action for U.S. Appl. No. 17/834,682, dated Jun. 12, 2023, 16 pages.

Non-Final Office Action for U.S. Appl. No. 17/834,697, dated Jun. 20, 2023, 12 pages.

International Preliminary Report on Patentability for International Patent Application No. PCT/US2022/032697, dated May 15, 2023, 19 pages.

Written Opinion for International Patent Application No. PCT/US2022/032694, dated Apr. 26, 2023, 6 pages.

Final Office Action for U.S. Appl. No. 17/834,682, dated Oct. 10, 2023, 14 pages.

International Preliminary Report on Patentability for International Patent Application No. PCT/US2022/032694, dated Aug. 30, 2023, 17 pages.

Notice of Allowance for U.S. Appl. No. 17/834,697, dated Nov. 14, 2023, 12 pages.

* cited by examiner

APPARATUS, SYSTEM, AND METHOD FOR CONFIGURING A CONFIGURABLE COMBINED PRIVATE AND SHARED CACHE

PRIORITY CLAIM

The present application claims priority to U.S. Provisional Patent Application Ser. No. 63/208,722, filed on Jun. 9, 2021, and entitled "APPARATUS, SYSTEM, AND METHOD FOR CONFIGURING A CONFIGURABLE COMBINED PRIVATE AND SHARED CACHE," the contents of which are incorporated herein by reference in its entirety.

BACKGROUND

I. Field of the Disclosure

The technology of the disclosure relates generally to configuring cache resources in a microprocessor, and specifically to configuring combined private and shared cache levels in a microprocessor.

II. Background

In order to provide low-latency retrieval of instructions and/or data (as compared to the latency of transactions to a main memory system such as a double data rate (DDR) memory, for example), microprocessors may conventionally include one or more levels of cache memory resources. These cache memory resources may be arranged in a hierarchical manner—for example, a microprocessor may have level 0 (L0), level 1 (L1), level 2 (L2), and level 3(L3) caches. An L0 cache may be the relative smallest and lowest latency, with the other caches increasing in size and latency up through the L3 cache, which may be the largest but with the longest latency compared to the other caches. In some aspects, one or more of the levels of cache hierarchy may have split instruction and data caches (e.g., the L0 cache level may comprise split L0 instruction and L0 data caches), whereas other levels of the cache hierarchy may contain both instructions and data. Some levels of the cache hierarchy may be "private" to the microprocessor or, in the case of a multi-core microprocessor, may be private to one or more individual core(s) (meaning that such private caches are only visible and accessible to the associated microprocessor or individual core(s)). Other levels of the cache hierarchy, despite being physically located with a particular microprocessor, may be shared across and usable by one or more other microprocessors in a system.

In order to efficiently utilize the available computing resources of a microprocessor, it may be desirable to run multiple applications or virtual machines on the same microprocessor. With respect to shared levels of the cache hierarchy, particularly in microprocessors with large numbers of individual cores, a conventional approach to cache design is to provide each core of the microprocessor with a private L2 cache of a fixed size, and a shared L3 of a fixed size which is shared among the cores of the microprocessor (and potentially across a system-on-chip interconnect). Although this approach can provide some benefit to many types of workloads, it does not allow for optimization to fit the characteristics of a specific workload. Especially in cases such as cloud or hyperscale computing, where large numbers of systems may be running a common workload with a known memory access profile, the static cache allocation described above may lead to lower overall performance of the workload (because the workload cannot use the existing cache hierarchy efficiently), or lower overall utilization of the available computing resources (if fewer instances of the workload are run per microprocessor to alleviate the performance problems as a result of the static cache hierarchy).

SUMMARY OF THE DISCLOSURE

Aspects disclosed in the detailed description include configuring a configurable combined private and shared cache in a processor. Related processor-based systems and methods are also disclosed. The configurable combined private and shared cache can function as a physically combined but logically separated private and shared cache for providing cache memory access to a processor and/or its processing cores. The configurable combined private and shared cache includes a plurality of cache ways. Because the private and shared portions of the configurable combined private and shared cache are included in the same physical cache structure, it is possible to change the relative amounts of the combined private and shared cache that are devoted to private and shared portions respectively. To set the sizes of the shared portion and the private portion the combined private and shared cache, in an exemplary aspect, a configuration is programmed or set in the configurable combined private and shared cache which allocates a first portion of the cache ways to the shared L3 portion, and a second portion of the cache ways to the private portion. The configuration of the combined private and shared cache can be dynamic and may be changed during operation of the processor, for example as part of a firmware configuration, by boot-time configuration, during system resets, during operation of the processor when the contents of all caches are to be flushed or invalidated, or at other times and in other manners that will occur to those having skill in the art. The configuration may be changed over time, as the processor-based system may from time to time have different applications or virtual machines allocated to run on the processor.

In this regard in one exemplary aspect, a processor-based system is provided. The processor-based system comprising a configurable combined private and shared cache, the configurable combined private and shared cache configured to include a shared portion and a private portion, and to be responsive to a dynamic cache configuration determining a size of each of the shared portion and the private portion.

In another exemplary aspect, a processor-based system is provided. The processor-based system comprises a means for storing information, the means include a shared portion and a private portion, and responsive to a means for configuring the means for storing information determining a size of each of the shared portion and the private portion In yet another exemplary aspect, a method of configuring caches in a processor-based system is provided. The method comprises dynamically configuring a combined private and shared cache structure to select a private cache portion and a shared cache portion.

In yet another exemplary aspect, a non-transitory computer-readable medium having stored thereon computer-executable instructions provided. The computer-executable instructions, which, when executed by a processor, cause the processor to dynamically configure a combined private and shared cache structure to select a private cache portion and a shared cache portion.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include configuring a configurable combined private and shared cache in a processor. Related processor-based systems and methods are also disclosed. The configurable combined private and shared cache can function as a physically combined but logically separated private and shared cache for providing cache memory access to a processor and/or its processing cores. The configurable combined private and shared cache includes a plurality of cache ways. Because the private and shared portions of the configurable combined private and shared cache are included in the same physical cache structure, it is possible to change the relative amounts of the combined private and shared cache that are devoted to private and shared portions respectively. To set the sizes of the shared portion and the private portion the combined private and shared cache, in an exemplary aspect, a configuration is programmed or set in the configurable combined private and shared cache which allocates a first portion of the cache ways to the shared L3 portion, and a second portion of the cache ways to the private portion. The configuration of the combined private and shared cache can be dynamic and may be changed during operation of the processor, for example as part of a firmware configuration, by boot-time configuration, during system resets, during operation of the processor when the contents of all caches are to be flushed or invalidated, or at other times and in other manners that will occur to those having skill in the art. The configuration may be changed over time, as the processor-based system may from time to time have different applications or virtual machines allocated to run on the processor.

Figure 1:
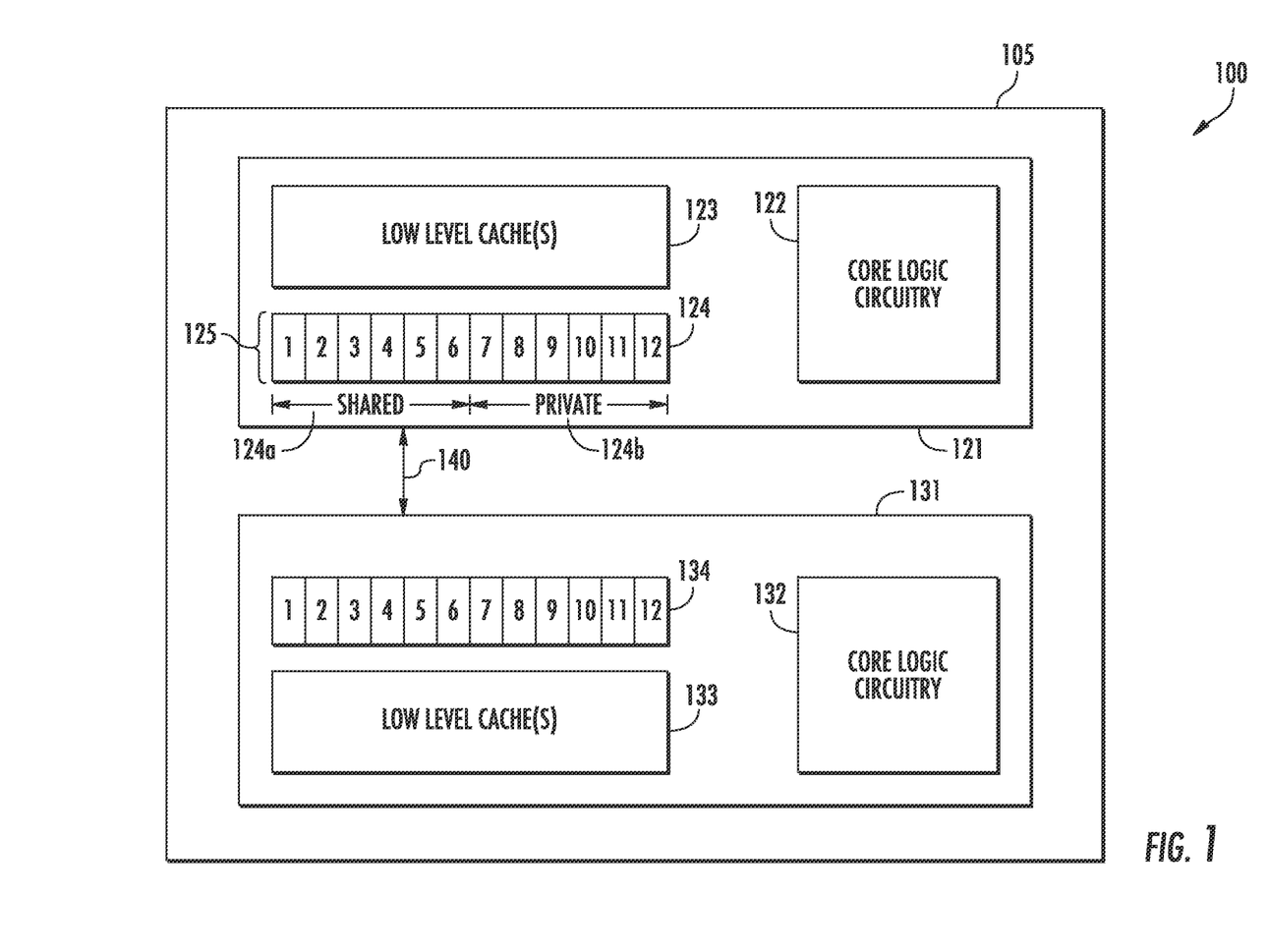
FIG. 1 is a block diagram of an exemplary system for configuring a combined private and share cache in a processor-based system.

In this regard, FIG. 1 is a block diagram of a processor-based system 100 including a processor 105 (e.g., a microprocessor) including a configurable combined private and shared cache, as will be discussed in greater detail herein. The processor 105 includes a first processing core 121 and a second processing core 131. The first processing core 121 further includes execution circuits 122, which may also be referred to as core logic circuitry 122, which are coupled to low level cache(s) 123 and a configurable combined private and shared cache 124, and which may receive instructions and data on which to perform operations from the low level cache(s) 123 and the combined private and shared cache 124. The low level cache(s) 123 may include L0 and L1 caches (whether split data and instruction caches, or combined), and the configurable combined private and shared cache 124 may include a private L2 and a shared L3 cache, in an aspect. The second processing core 131 further includes execution circuits 132, which may also be referred to as core logic circuitry 132, which are coupled to low level cache(s) 133 and a configurable combined private and shared cache 134, and which may receive instructions and data on which to perform operations from the low level cache(s) 133 and the combined private and shared cache 134. The low level cache(s) 133 may include L0 and L1 caches (whether split data and instruction caches, or combined), and the configurable combined private and shared cache 134 may include a private L2 and a shared L3 cache, in an aspect. The first processing core 121 and the second processing core 131 may communicate over an interconnect 140.

In the illustrated aspect, the configurable combined private and shared cache 124 functions as a physically combined but logically separated private L2 and shared L3 cache, illustrated as a shared L3 portion 124a and private L2 portion 124b, and includes a plurality of cache ways 125-1 through 125-12. Because the private L2 and shared L3 portions are included in the same physical cache structure, it is possible to change the relative amounts of the combined private and shared cache 124 that are devoted to private L2 and shared L3 portions respectively. To set the sizes of the shared L3 portion 124a and the private L2 portion 124b, a configuration is programmed or set in the configurable combined private and shared cache 124 which allocates a first portion of the cache ways 125-1 to 125-12 to the shared L3 portion 124a, and a second portion of the cache ways 125-1 to 125-12 to the private L2 portion 124b. The configuration of the combined private and shared cache 124 is dynamic and may be changed during operation of the processor 105, for example as part of a firmware configuration, by boot-time configuration, during system resets, during operation of the processor 105 when the contents of all caches are to be flushed or invalidated, or at other times and in other manners that will occur to those having skill in the art. The configuration may be changed over time, as the processor-based system 100 may from time to time have different applications or virtual machines allocated to run on the processor 105.

For example, at a first time, the shared L3 portion 124a may include cache ways 125-1 to 125-6, while the private L2 portion 124b may include cache ways 125-7 to 125-12. At a later time, when the microprocessor 105 is re-booted, for example, the configuration may be changed such that the shared L3 portion 124 may include cache ways 125-1 to 125-8, while the private L2 portion 124b may include cache ways 125-9 to 125-12. In some aspects, the configurable combined private and shared cache 124 may allow complete flexibility regarding the sizes of the shared L3 portion 124a and the private L2 portion 124b (i.e., each of the portions may be set to a size anywhere from zero ways to all ways of the configurable combined private and shared cache 124), whereas in other aspects, lower and/or upper limits on the size of either or both the shared L3 portion 124a and the private L2 portion 124b may be established (e.g., the private L2 portion 124b may not be smaller than two ways, and/or the shared L3 portion 124a may not be smaller than four ways). Those having skill in the art will understand that the above aspects are included by way of illustration and not by limitation, and that other configurations of the shared L3 portion 124a and the private L2 portion 124b are possible.

In the illustrated aspect, the configurable combined private and shared cache 134 may function similarly to the configurable combined private and shared cache 124, and as such may also include a plurality of cache ways 125-1 through 125-12. The configurable combined private and shared cache 134 may share a configuration with the configurable combined private and shared cache 124, or may be configured differently, depending on any requirements of an associated system architecture, design considerations, or other design choices as will be apparent to those having skill in the art.

Figure 2:
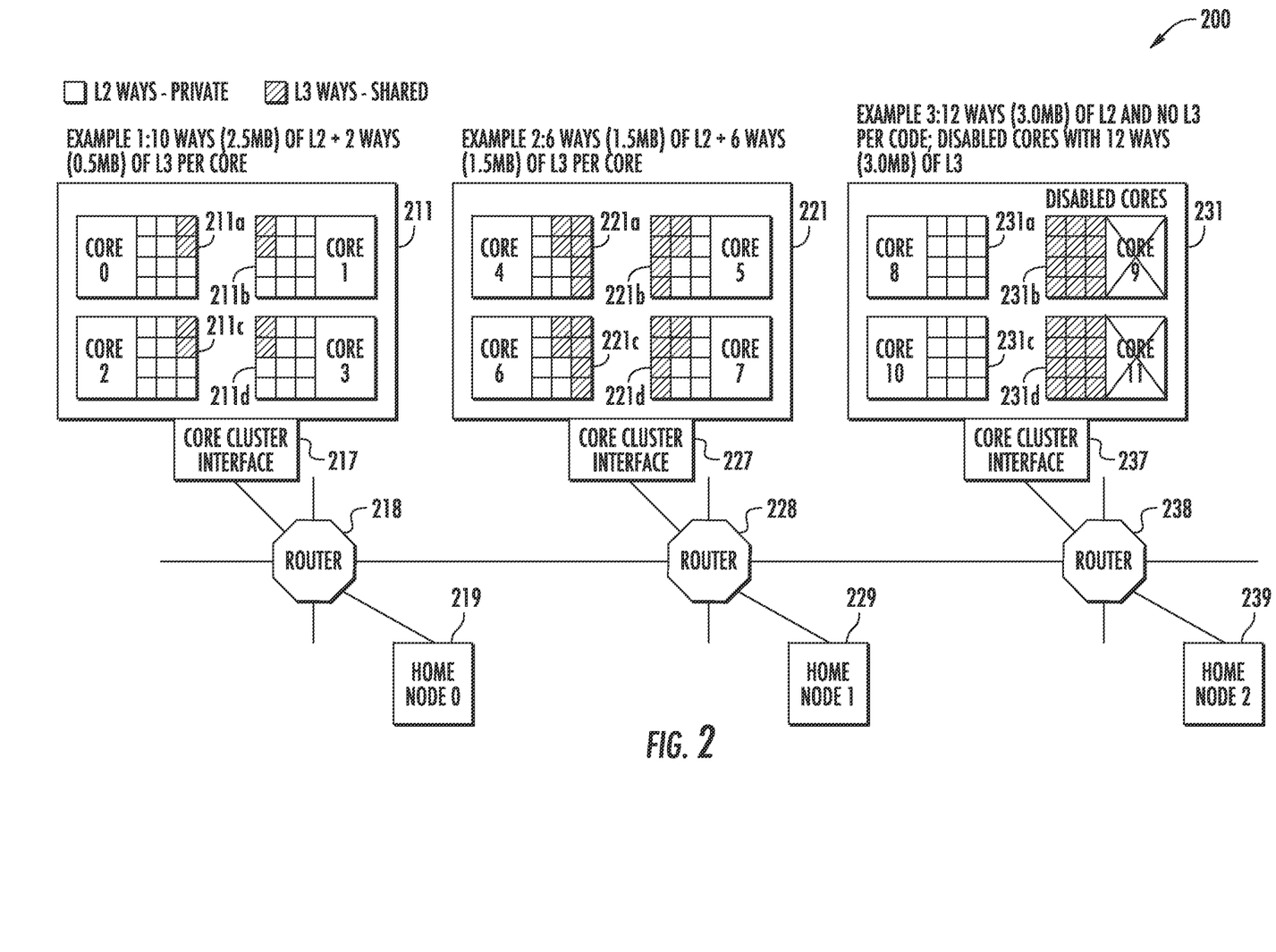
FIG. 2 is a block diagram of another exemplary system including combined private and shared caches in a processor-based system.

In this regard, FIG. 2 is a block diagram of a processor-based system 200 including combined private and shared caches. The processor-based system 200 includes a first processing cluster 211, which is coupled to a first core cluster interface 217 and a first router 218. A first home node 219 is coupled to the first router 218. The processor-based system 200 further includes a second processing cluster 221, which is coupled to a second core cluster interface 227 and a second router 228. A second home node 229 is coupled to the second router 228. The processor-based system 200 further includes a third processing cluster 231, which is coupled to a third core cluster interface 237 and a third router 238. A third home node 239 is coupled to the third router 238. The home nodes 219, 229, and 239 may manage coherency for at least a set of memory addresses of the processor-based system 200 for their associated processing clusters, which may include snooping and invalidating caches, allocating and managing the shared caches, and performing transactions with a system memory (e.g., DDR DRAM in one aspect). The routers 218, 228, and 238 may be coupled together as part of a system interconnect in order to allow the processing clusters 211, 221, and 231 to communicate and transfer instructions and data between them and to access system memory.

The first processing cluster 211 includes four processing cores 211a-211d. Each of the processing cores 211a-211d includes a configurable combined private and shared cache which has been configured to include ten (10) ways of private cache and 2 ways of shared cache. The second processing cluster 221 includes four processing cores 221a-221d. Each of the processing cores 221a-221d includes a configurable combined private and shared cache which has been configured to include 6 ways of private cache and 6 ways of shared cache. The third processing cluster 231 includes four processing cores 231a-231d, but two of the processing cores (231b and 231d) are disabled (e.g., as a result of manufacturing defects, by deliberate fusing, or other configuration methods), although their caches are still enabled and available. The two active processing cores 231a and 231c have been configured to include 12 ways of private cache and 0 ways of shared cache, while the disabled processing cores 231b and 231d have been configured to include 0 ways of private cache (since their associated cores are disabled) and 12 ways of shared cache, which may still be usable by other cores in the processor-based system.

Figure 3:
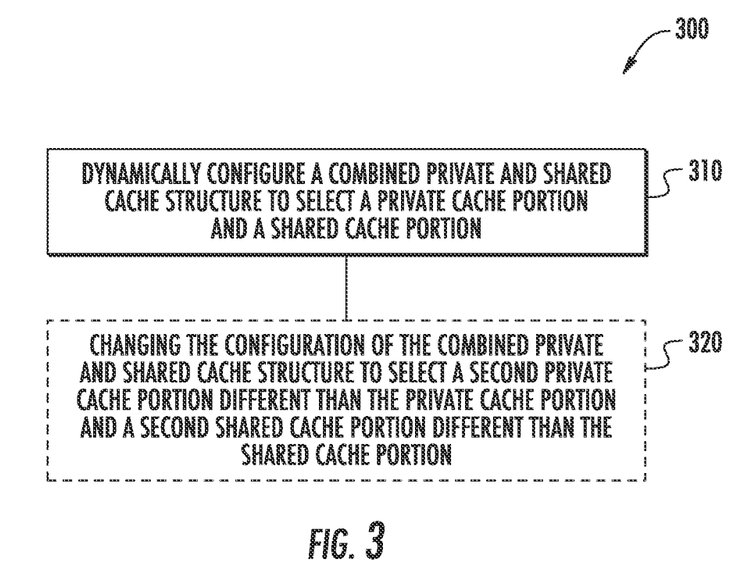
FIG. 3 is a block diagram of a method for configuring a combined private and shared cache.

FIG. 3 is a block diagram of a method 300 for configuring a combined private and shared cache according to one aspect. The method 300 begins in block 310 by dynamically configuring a combined private and shared cache structure to select a private cache portion and a shared cache portion. For example, as discussed with reference to FIG. 1, this configuration may be included in a firmware configuration, performed by boot-time configuration, during system resets, or during operation of the processor 105 when the contents of all caches are to be flushed or invalidated. In some aspects in which the combined private and shared cache structure comprises a plurality of ways, the operation of block 310 for dynamically configuring the combined private and shared cache structure to select the private cache portion and the shared cache portion may comprise allocating the shared cache portion and the private cache portion to include at least a respective shared portion and a respective private portion of the plurality of ways. According to some such aspects, operations for allocating the shared cache portion and the private cache portion to include at least a respective shared portion and a respective private portion of the plurality of ways may comprise allocating either of the shared cache portion and the private cache portion to include all of the plurality of ways. Some aspects may provide that the operations of block 310 for dynamically configuring the combined private and shared cache structure to select the private cache portion and the shared cache portion may comprise storing a value in a configuration register (CR) that indicates a count of the plurality of ways assigned as the shared cache portion.

The method 300 optionally continues at block 320 by changing the configuration of the combined private and shared cache structure to select a second private cache portion different than the private cache portion, and a second shared cache portion different that the shared cache portion. For example, as discussed with reference to FIG. 1, during an initial boot of the microprocessor 105, the shared L3 portion 124a may include cache ways 125-1 to 125-6, while the private L2 portion 124b may include cache ways 125-7 to 125-12. At a later time, when the microprocessor 105 is re-booted, for example, the configuration may be changed such that the shared L3 portion 124 may include cache ways 125-1 to 125-8, while the private L2 portion 124b may include cache ways 125-9 to 125-12.

Figure 4:
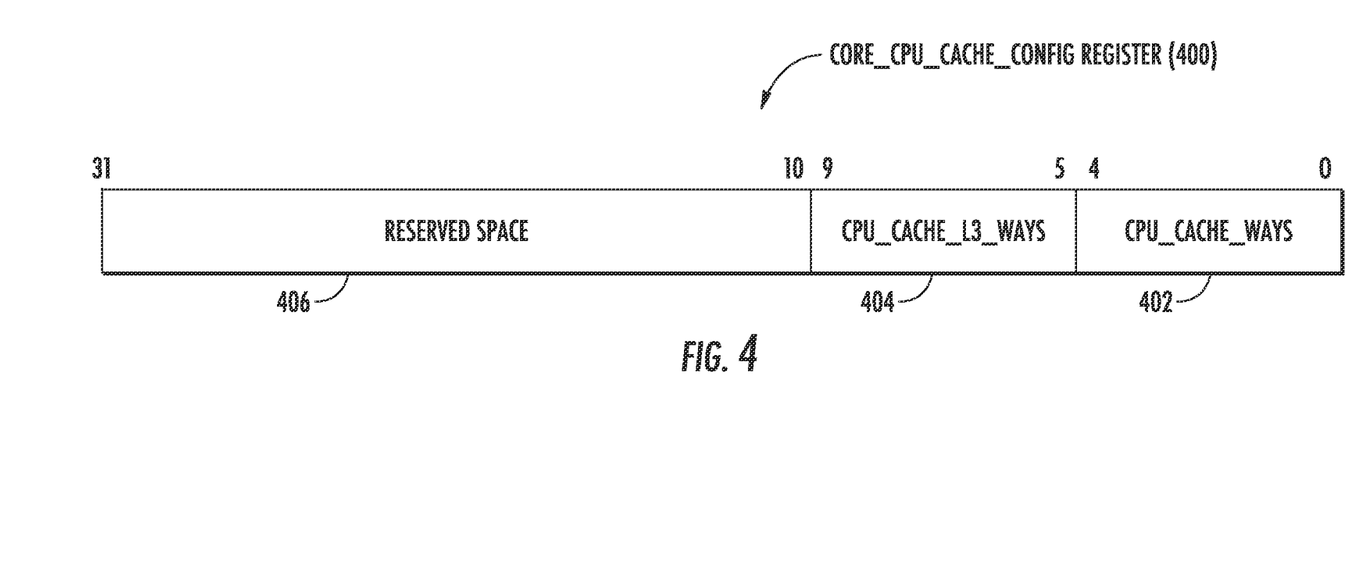
FIG. 4 illustrates an exemplary configuration register (CR) that may be provided in some aspects to enable configuration of combined private and shared caches.
Figure 5:
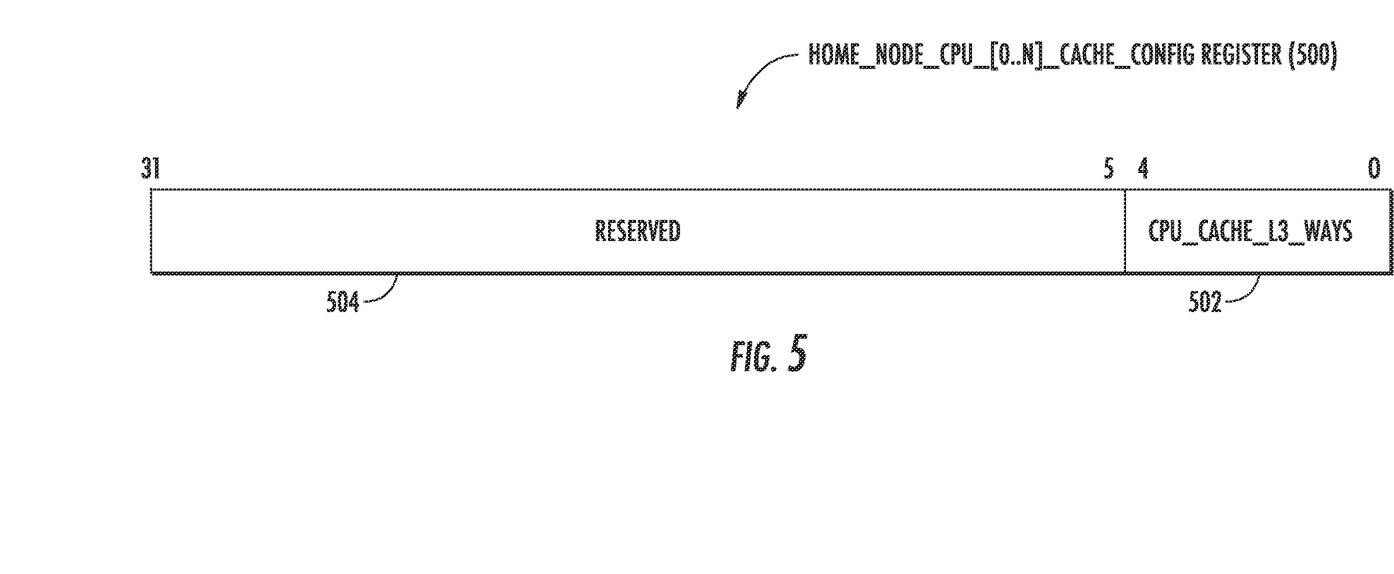
FIG. 5 illustrates another exemplary CR that may be provided for configuration of combined private and shared caches according to some aspects.

As noted above, the configuration of the combined private and shared cache described herein is dynamic and may be changed during operation. In this regard, FIGS. 4 and 5 illustrate registers that may be provided in some aspects to enable configuration of combined private and shared caches such as the configurable combined private and shared caches 124 and 134 of FIG. 1. In FIG. 4, a Core_CPU_Cache_Config register 400 is a 32-bit CR that may be implemented in each CPU core of a processor-based device, such as the processing cores 211a-211d, 221a-221d, and 231a-231d of the processor-based device 200 of FIG. 2. The Core_CPU_Cache_Config register 400 comprises a CPU_Cache_Ways field 402 and a CPU_Cache_L3_Ways field 404, each of which are five (5) bits in size, with the remainder of the CPU_Cache_Config register 400 comprising a reserved space 406. The CPU_Cache_Ways field 402 stores a read-only value that indicates to firmware and/or software a total number of ways in each set of a corresponding CPU cache. The CPU_Cache_L3_Ways field 404 stores a read/write value that enables the firmware and/or software to configure how many of the ways are assigned as shared L3 cache. The remaining ways in the CPU cache are available to the CPU core as private L2 cache. The Core_CPU_Cache_Config register 400 applies to all sets in the CPU cache.

FIG. 5 shows a Home_Node_CPU_[0 . . . N]_Cache_Config register 500, which is a 32-bit CR implemented in each home node of a processor-based device (e.g., the home nodes 219, 229, and 239 of the processor-based device 200 of FIG. 2), with one copy of the Home_Node_CPU_[0 . . . N]_Cache_Config register 500 implemented for each CPU core (e.g., the processing cores 211a-211d, 221a-

221*d*, and 231*a*-231*d* of FIG. 2) of the processor-based device. The Home_Node_CPU_[0 . . . N]_Cache_Config register 500 comprises a CPU_Cache_L3_Ways field 502 that is five (5) bits in size, and that stores a read/write value that allows firmware and/or software to configure how many of the ways of each CPU core are assigned as shared L3 cache. This value is used by the corresponding home node to build a weighting table (not shown), in which CPU cores with more assigned L3 ways have a higher weighting than CPU cores with fewer assigned L3 ways. The CPU_Cache_L3_Ways field 502 for each CPU core must be configured with the same value as the CPU_Cache_L3_Ways field 404 in the Core_CPU_Cache_Config register 400 in the corresponding CPU core.

Figure 6A:
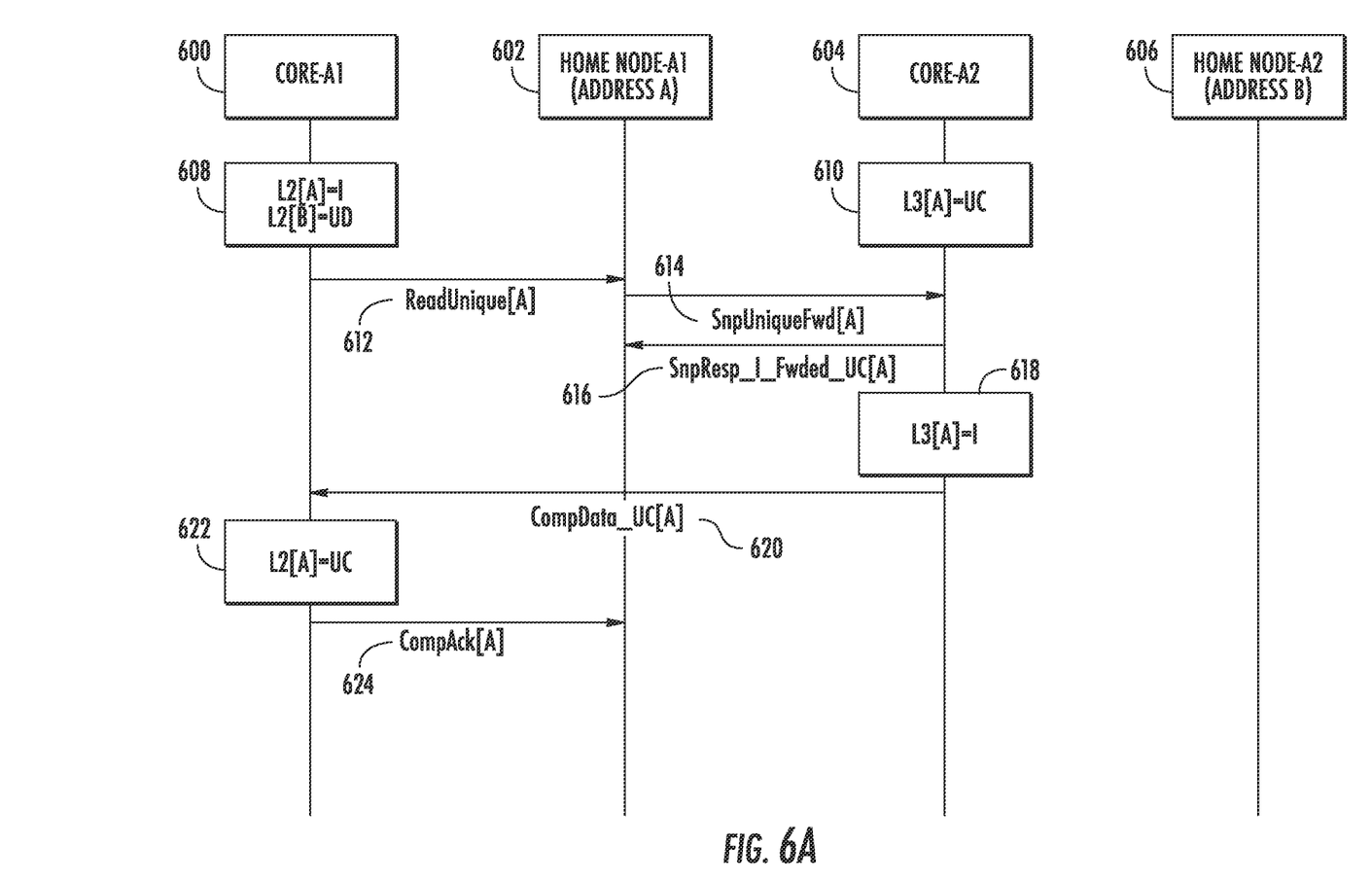
FIGS. 6A and 6B illustrates exemplary communications flows and operations performed by processor cores and home nodes for sending and responding to cache requests according to some aspects.
Figure 6B:
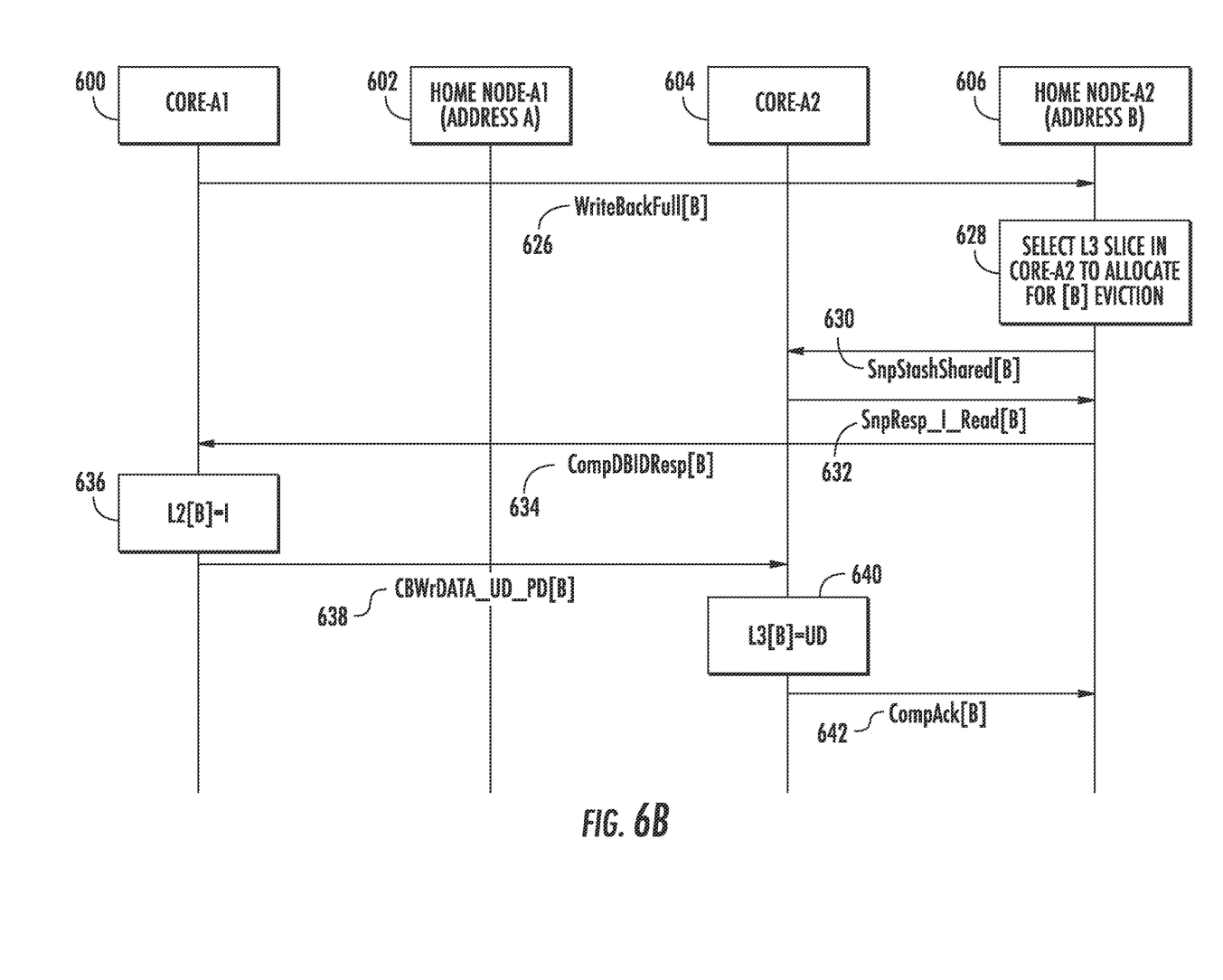

To illustrate exemplary communications flows and operations performed by processor cores and home nodes for sending and responding to cache requests, FIGS. 6A and 6B are provided. FIG. 6A illustrates a transaction, based on the ARM Coherent Hub Interface (CHI) coherency protocol, in which a read to an address A misses on a first processor core's own CPU cache but hits in a shared L3 portion of a second processor core, resulting in allocation in the private L2 cache of the second processor core and eviction of an existing entry for an address B. FIG. 6B illustrates a transaction involving the writeback of address B (including dirty data), which is then allocated in the shared L3 cache of the second processor core. FIGS. 6A and 6B include a processor core designated as Core-A1 600, a corresponding home node designated as Home Node-A1 602, a processor core designated as Core-A2 604, and a corresponding home node designated as Home Node-A2 606. Each of the Core-A1 600, the Home Node-A1 602, the Core-A2 604 and the Home Node-A2 606 are represented by vertical lines, with operations performed by each element represented by blocks on the corresponding vertical line and communications between elements represented by arrows between the corresponding vertical lines.

Operations in FIG. 6A begin with the Core-A 600 holding contents of address A in an Invalid (I) state in its private L2 cache, and holding contents of address B in a Unique Dirty (UD) state in its private L2 cache (block 608). Similarly, the Core-A2 604 is holding contents of address A in a Unique Clean (UC) state in its shared L3 cache (block 610).

The Core-A1 600 needs to read address A with unique ownership (e.g., so that it can execute a store instruction to address A), so it performs a ReadUnique request (i.e., a request to read a memory location and obtain exclusive ownership of the corresponding cache line) to address A, which is routed to the Home Node-A1 602, as indicated by arrow 612. The Home Node-A1 602 determines that the Core-A2 604 is holding a unique copy of the contents of address A, and thus the Home Node-A1 602 sends a forwarding snoop (i.e., an invalidating snoop including a request to forward data to the requestor) to the Core-A2 604, as indicated by arrow 614. The Core-A2 604 sends a SnpResp_I_Fwded_UC[A] response to the Home Node-A1 602 to inform it that it has forwarded the cache line to the requester in the UC state and invalidated its copy, as indicated by arrow 616. The Core-A2 604 also invalidates its copy of the contents of address A (block 618). The Core-A2 604 then sends a CompData_UC message (i.e., a combined completion and data message along with the UC state) to forward the cache line of address A to the Core-A1 600, as indicated by arrow 620. The Core-A1 600 allocates space for and stores the contents of address A in its L2 cache, where it holds the contents of address A in a UC state (block 622). The Core-A1-600 then sends a final CompAck message (i.e., a completion acknowledgement message) response to the Home Node-A1 602 to acknowledge that it has received the cache line and the transaction is complete, as indicated by arrow 624.

Turning now to FIG. 6B, the Core-A1 600 evicts the contents of address B from its L2 cache and needs to write it back to memory, so the Core-A1 600 sends a WriteBack-Full[B] request (i.e., a request to write back a full cache line of dirty data from the cache) to the Home Node-A2 606, as indicated by arrow 626. The Home Node-A2 606 selects the Core-A2 604 to allocate space in its L3 cache for the evicted contents of address B (block 628). The Home Node-S2 606 then sends a SnpStashShared request (i.e., a snoop message with a stash request that the cache line be read and allocated in the cache) to the Core-A2 604, as indicated by arrow 630. The Core-A2 604 then sends a SnpResp_I_Read[B] response (i.e., a snoop response indicating that the cache line is not currently valid, and including a red request to obtain the cache line) to the Home Node-A2 606 in response to the stashing snoop request, as indicated by arrow 632.

The Home Node-A2 606 next sends a CompDBIDResp [B] response (i.e., a combined completion and data buffer ID response) to informing the Core-A1 600 that it can proceed with sending the writeback data to the Core-A2 604 using the data buffer ID provided), as indicated by arrow 634. The Core-A1 600 invalidates its copy of the contents of address B in its L2 cache (block 636). The Core-A1 600 then sends a CBWrData_UD_PD message (i.e., a message to copy back write data for the writeback, in which the cache line was in the UD state when it was sent, and the UD state is being passed to the target) to the Core0A2 604, as indicated by arrow 638. The Core-A2 604 allocates space for and stores the contents of address B in its L3 cache (i.e., based on a dynamic configuration defining its L3 cache) (block 640). The Core-A2 604 sends a final CompAck message (i.e., a completion acknowledgement message) response to the Home Node-A2 606 to inform it that it has received the cache line, and the transaction is complete, as indicated by arrow 642.

The exemplary processor including a configurable combined private and shared cache structure according to aspects disclosed herein and discussed with reference to FIGS. 1-6 may be provided in or integrated into any processor-based device. Examples, without limitation, include a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
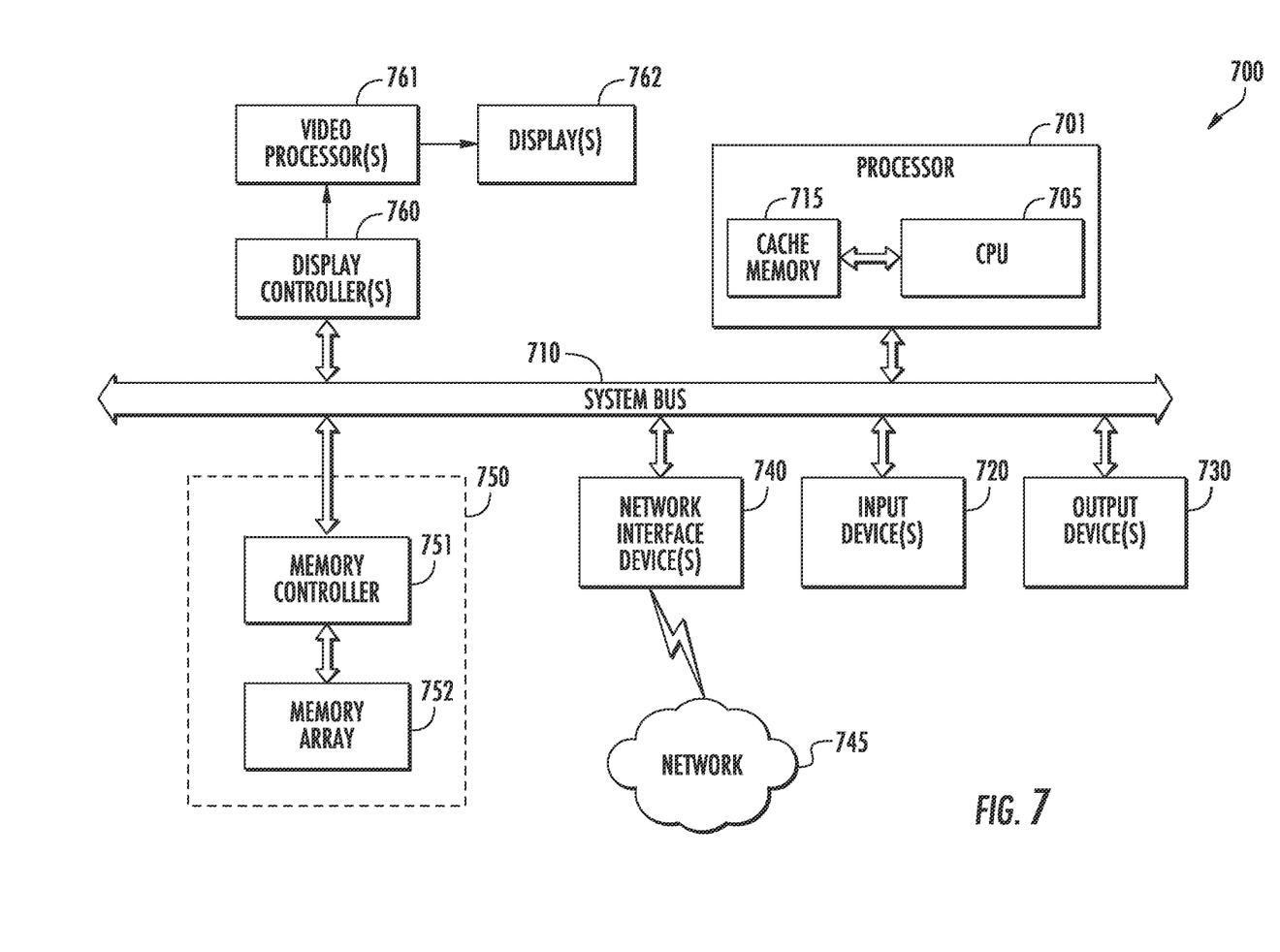
FIG. 7 is a block diagram of an exemplary processor-based system including a processor having a combined private and shared cache.

In this regard, FIG. 7 illustrates an example of a processor-based system 700 that includes a configurable combined private and shared cache structure as illustrated and described with respect to FIGS. 1-6. In this example, the processor-based system 700 includes a processor 701 having one or more central processing units (CPUs) 705, each including one or more processor cores, and which may correspond to the processor 105 of FIG. 1, and as such may include a configurable combined private and shared cache structure as illustrated and described with respect to FIGS. 1-6. The CPU(s) 705 may be a master device. The CPU(s) 705 is coupled to a system bus 710 and can intercouple master and slave devices included in the processor-based system 700. As is well known, the CPU(s) 705 communicates with these other devices by exchanging address, control, and data information over the system bus 710. For example, the CPU(s) 705 can communicate bus transaction requests to a memory controller 751 as an example of a slave device. Although not illustrated in FIG. 7, multiple system buses 710 could be provided, wherein each system bus 710 constitutes a different fabric.

Other master and slave devices can be connected to the system bus 710. As illustrated in FIG. 7, these devices can include a memory system 750, one or more input devices 420, one or more output devices 430, one or more network interface devices 740, and one or more display controllers 760, as examples. The input device(s) 720 can include any type of input device, including, but not limited to, input keys, switches, voice processors, etc. The output device(s) 730 can include any type of output device, including, but not limited to, audio, video, other visual indicators, etc. The network interface device(s) 740 can be any devices configured to allow exchange of data to and from a network 745. The network 745 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 740 can be configured to support any type of communications protocol desired. The memory system 750 can include the memory controller 751 coupled to one or more memory arrays 752.

The CPU(s) 705 may also be configured to access the display controller(s) 760 over the system bus 710 to control information sent to one or more displays 762. The display controller(s) 760 sends information to the display(s) 762 to be displayed via one or more video processors 761, which process the information to be displayed into a format suitable for the display(s) 762. The display(s) 762 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A processor-based system comprising:
   a configurable combined private and shared cache, the configurable combined private and shared cache comprising a plurality of ways and configured to include a shared portion and a private portion, and to be responsive to a dynamic cache configuration determining a size of each of the shared portion and the private portion; and a processor core associated with a corresponding configuration register (CR);

wherein:
the dynamic cache configuration is configured to allocate the shared portion and the private portion to include at least a respective shared portion and a respective private portion of the plurality of ways;
a value stored by the CR indicates a count of the plurality of ways assigned as the shared portion; and
a remainder of the plurality of ways is assigned as the private portion.

2. The processor-based system of claim 1, wherein the shared portion and the private portion are part of a same physical cache structure.

3. The processor-based system of claim 1, wherein the dynamic cache configuration is configured to allocate either of the shared portion and the private portion to include all of the plurality of ways.

4. The processor-based system of claim 1, wherein the dynamic cache configuration is configured to be changed during operation.

5. The processor-based system of claim 1, wherein the processor-based system is configured to store a cache line in one of the shared portion and the private portion based on the dynamic cache configuration.

6. The processor-based system of claim 1, integrated into an integrated circuit (IC).

7. The processor-based system of claim 1, further integrated into a device selected from the group consisting of: a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

8. A processor-based system, comprising:
means for storing information, the means include a shared portion and a private portion, and responsive to a means for configuring the means for storing information determining a size of each of the shared portion and the private portion;
wherein:
the means for configuring the means for storing information determining the size of each of the shared portion and the private portion comprises:
means for storing a value in a configuration register (CR) that indicates a count of a plurality of ways of a cache structure assigned as the shared portion; and
means for allocating the shared portion and the private portion to include at least a respective shared portion and a respective private portion of the plurality of ways.

9. A method of configuring caches in a processor-based system, comprising dynamically configuring a combined private and shared cache structure to select a private cache portion and a shared cache portion;
wherein:
the combined private and shared cache structure comprises a plurality of ways; and
dynamically configuring the combined private and shared cache structure to select the private cache portion and the shared cache portion comprises:
storing a value in a configuration register (CR) that indicates a count of the plurality of ways assigned as the shared cache portion; and
allocating the shared cache portion and the private cache portion to include at least a respective shared portion and a respective private portion of the plurality of ways.

10. The method of claim 9, further comprising changing the configuration of the combined private and shared cache structure to select a second private cache portion different than the private cache portion, and a second shared cache portion different than the shared cache portion.

11. The method of claim 9, wherein allocating the shared cache portion and the private cache portion to include at least the respective shared portion and the respective private portion of the plurality of ways comprises allocating either of the shared cache portion and the private cache portion to include all of the plurality of ways.

12. A non-transitory computer-readable medium having stored thereon computer-executable instructions which, when executed by a processor, cause the processor to dynamically configure a combined private and shared cache structure to select a private cache portion and a shared cache portion;
wherein:
the combined private and shared cache structure comprises a plurality of ways; and
the computer-executable instructions cause the processor to dynamically configure the combined private and shared cache structure to select the private cache portion and the shared cache portion by causing the processor to:
store a value in a configuration register (CR) that indicates a count of the plurality of ways assigned as the shared cache portion; and
allocate the shared cache portion and the private cache portion to include at least a respective shared portion and a respective private portion of the plurality of ways.

13. The non-transitory computer-readable medium of claim 12 having stored thereon computer-executable instructions which, when executed by a processor, further cause the processor to:
change the configuration of the combined private and shared cache structure to select a second private cache portion different than the private cache portion, and a second shared cache portion different than the shared cache portion.

14. The non-transitory computer-readable medium of claim 12, wherein the computer-executable instructions cause the processor to allocate the shared cache portion and the private cache portion to include at least the respective shared portion and the respective private portion of the plurality of ways by causing the processor to allocate either of the shared cache portion and the private cache portion to include all of the plurality of ways.

* * * * *